US006304743B1

(12) United States Patent
Fujii et al.

(10) Patent No.: US 6,304,743 B1
(45) Date of Patent: Oct. 16, 2001

(54) IMAGE FORMATION METHOD AND APPARATUS FOR DOUBLE-FACED ORIGINALS WITH DIFFERENT ORDERS OF IMAGE READING AND IMAGE FORMING

(75) Inventors: Takayuki Fujii, Tokyo; Chikara Sato, Hachioji; Katsuya Yamazaki, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/459,923

(22) Filed: Dec. 14, 1999

(30) Foreign Application Priority Data

Dec. 15, 1998 (JP) ........................................ 10-375295

(51) Int. Cl.[7] ........................................ G03G 15/00
(52) U.S. Cl. ........................................ 399/374
(58) Field of Search ........................................ 399/364, 373, 399/374

(56) References Cited

U.S. PATENT DOCUMENTS 4,099,150 * 7/1978 Connin ........................................ 399/364
4,512,651 * 4/1985 Dunleavy ........................................ 399/364
4,990,941 * 2/1991 Kawai ........................................ 399/374 X
5,371,580 * 12/1994 Kato et al. ........................................ 399/264 X
6,021,305 * 2/2000 Sato et al. ........................................ 399/374

* cited by examiner

*Primary Examiner*—Fred L. Braun
(74) *Attorney, Agent, or Firm*—Fitzpatrick, Cella, Harper & Scinto

(57) ABSTRACT

An image formation apparatus provides a method of improving productivity in case of forming images onto both of the faces of a sheet. According to the method, an original is read by the apparatus in the order of its back face and front face sequentially. The read images are formed onto the sheet in the order of front-faced image and back-faced image of the original. Images of three originals D1, D2 and D3 which are read by an image sensor in the order of second, first, fourth, third, sixth and fifth pages are subjected to editing processing by an image processing unit. If the image data of the first page is stored into a hard disk, the image data of the first page (front-faced image of original D1) is formed onto the first face of a fed sheet P1. Subsequently, if the image data of the third page is stored, the image data of the third page (front-faced image of original D2) is formed onto the first face of a fed sheet P2. Similarly, after the front-faced image of the original D3 is formed, the back-faced image of the original D1 is formed onto the second face of the sheet P1.

14 Claims, 10 Drawing Sheets

TWO-FACED ORIGINAL FEEDING ORDER

TWO-FACED ORIGINAL READING ORDER

TWO-FACED COPYING ORDER

TWO-FACED COPYING SHEET OUTPUT ORDER

TWO-FACED ORIGINAL FEEDING ORDER
D1 1
D2 3
D3 5

TWO-FACED ORIGINAL READING ORDER
REVERSE
DISCHARGE, FEED
DISCHARGE

TWO-FACED COPYING ORDER
P1 1-1
P2 1-3
P3 1-5
P1 1-2
P4 2-1
P2 1-4
P5 2-3
P3 1-6
P6 2-5
P4 2-2
P5 2-4
P6 2-6

TWO-FACED COPYING SHEET OUTPUT ORDER
P1 2
P2 4
P3 6
P4 2
P5 4
P6 6
1ST COPY OUTPUT
2ND COPY OUTPUT

IMAGE FORMATION METHOD AND APPARATUS FOR DOUBLE-FACED ORIGINALS WITH DIFFERENT ORDERS OF IMAGE READING AND IMAGE FORMING

BACKGROUND OF THE INVENTION

1. Field of the Invention

The present invention relates to image formation apparatus and method which read images of originals fed from an original feeder and form the read images onto sheets.

2. Related Background Art

Conventionally, an image formation apparatus which performs double-faced copying from the first page of a double-faced original in due order has been known. FIGS. 9A, 9B, 9C and 9D respectively show the order of feeding of the double-faced originals, the order of image reading thereof, the order of image formation and the order of copy discharging in the case where the double-faced copying is conventionally performed from the double-faced originals. In the drawings, the case where two double-faced copies (i.e., duplicates) are obtained from the three double-faced originals is shown.

In this image formation apparatus (conventional example 1), an uppermost original sheet (also referred as simply "original" hereinafter) D1 being the first page of an original D put on an original tray is fed and carried to a read position on a platen. Then, after image reading on the front face (first page) of the original is performed, the original is reversed by a reverse path. The reversed original is again carried to the read position on the platen, and image reading on the back face (second page) of the original is performed.

Thus, the reading of the images of the double-faced original D1 ends. Next, the original is again reversed by the reverse path to adjust the order of the pages of the original on a sheet discharge tray of an original feeder, whereby the first page is discharged facedown to the sheet discharge tray. At the same time, feeding of a next original D2 to the platen starts, and as in the case of the original D1, the reading of the images of the third and fourth pages of the original is performed. Subsequently, the images of a double-faced original D3 are similarly read, and the original D3 is discharged to the sheet discharge tray. Thus, the images of the first to sixth pages of the originals D1 to D3 are sequentially read.

In case of forming double-faced images (i.e., images on the front and back faces of a recording sheet), the image of the first page of the original is first formed onto the first face of a sheet P1, and the operation waits for the image of the third page of the original to be read. Then, the image of the third page is read, and at the same time the image of the third page is formed onto the first face of a sheet P2. Similarly, the image of the fifth page is formed onto the first page of a sheet P3. The images of the first, third and fifth pages of the originals are formed at intervals necessary because of delay in reading the originals. Similarly, the image of the fifth page is formed onto the first page of a sheet P3. The images of the first, third and fifth pages of the originals are formed at intervals necessary because of delay in reading the originals.

If the image formation of the fifth page ends, the reversed sheet P1 is fed from a not-shown double-faced path to a transfer unit, the image of the second page is formed onto the second face of the sheet P1, and the sheet is discharged outside the apparatus with the image of the first page facedown.

Hereafter, the images are formed alternately onto sheets (P4, P5, P6) fed from cassettes and the sheet returned from the double-faced path, and the sheets to which the formation of the double-faced images ended are discharged outside the apparatus in due order.

FIGS. 10A, 10B, 10C and 10D respectively show the order of feeding of the double-faced originals, the order of image reading thereof, the order of image formation and the order of copy discharging in the other case where the double-faced copying is conventionally performed from the double-faced originals. In the drawings, like FIGS. 9A to 9D, the case where the two double-faced copies (i.e., duplicates) are obtained from the three double-faced originals is shown.

In this image formation apparatus (conventional example 2), an uppermost original sheet (also referred as simply "original" hereinafter) D1 being the first page of an original D put on the original tray is fed and carried to the read position on the platen (this operation is called as "blank carrying"). In this example, the image on the front face (first page) of the original is not read, the original is reversed by the reverse path, and the reversed original is returned to the read position on the platen. Next, the image on the second page (back face) of the original D1 is read. Then the original is again reversed by the reverse path, and the image on the first page (front face) of the original D1 is read.

Since the first page of the original faces downward in this state, if the original is discharged as it is, it is possible to adjust the order of the pages of the original on the sheet discharge tray of the original feeder. At the same time, feeding of a next original D2 to the platen starts, and as well as the case of the original D1, the images of the fourth and following pages of the original are read.

Hereinafter, the images are sequentially read in the similar manner, and finally the images of the second, first, fourth, third, sixth and fifth pages are read in that order.

In case of forming the double-faced images, the image of the second page of the original is formed onto the first face of a sheet P1, and the operation waits for the image of the fourth page of the original to be read. Then, the image of the fourth page is read, and at the same time the image of the fourth page is formed onto the first face of a sheet P2. Similarly, the image of the sixth page is formed onto the first page of a sheet P3.

If the image formation of the sixth page ends, the reversed sheet P1 is fed from the not-shown double-faced path to the transfer unit, and the image of the first page is formed onto the second face of the sheet P1. In this state, the second page of the original faces downward. If the original is discharged as it is, it is impossible to adjust the order of the pages of the original on the sheet discharge tray of the original feeder. Therefore, the sheet is reversed before it is discharged outward.

Hereafter, similarly, the images are formed alternately onto sheets (P4, P5, P6) fed from the cassettes and the sheet returned from the double-faced path, and the sheets to which the formation of the double-faced images ended are discharged outside the apparatus in due order.

However, in such the conventional image formation apparatus as described above, the following problems have occurred, so that improvement has been demanded.

Namely, in the conventional image formation apparatus (conventional example 1), in order to adjust the order of the pages of the original on the sheet discharge tray of the original feeder, it is necessary to reverse the sheet also when it is discharged. For this reason, it is necessary to perform the reverse operation twice while the image of one original is read.

Further, in the conventional structure, the carrying path to feed the original from the original tray to the platen and the reverse carrying path to reverse the original fed from the platen and return it to the platen are partially made in common to downsize the apparatus itself. Thus, it is impossible to feed the next original until the reverse operation for discharging the previous original ends.

As described above, productivity in a double-faced processing mode is low due to the factors on the original feeder side. Especially, when the numerous sheets are set to the original tray, decrease in productivity appears remarkably.

On the other hand, in the conventional image formation apparatus (conventional example 2), it is necessary to perform the reverse operation twice, i.e., one reverse operation before the image is read and one reverse operation after the image is read. Although this is similar to the conventional example 1, it is possible in the conventional example 2 to feed the next original simultaneously with the discharge of the previous original. Thus, it is possible in the conventional example 2 to make the original reading and discharging faster than the conventional example 1.

However, it is necessary to perform the reverse operation to adjust the order of the pages of the sheets to be discharged when the sheets to which the formation of the double-faced images ended are discharged outside the apparatus. Therefore, it is necessary to feed the sheets with appropriate intervals in consideration of the time required for such reverse operation, whereby productivity in the double-faced processing mode is low due to the factors on the image formation apparatus side.

SUMMARY OF THE INVENTION

An object of the present invention is to solve the above-described problems.

Another object of the present invention is to provide image formation apparatus and method which can improve productivity in case of forming images onto both the faces of a sheet.

In order to achieve the above objects, the present invention is featured by providing an image formation apparatus which includes an original feeder, reads an image of an original fed from the original feeder, and forms the read image onto a sheet, comprising:

read means for reading double-faced images of the original fed from the original feeder, in predetermined face order;

storage means for storing the read double-faced images; and image formation means for forming the stored double-faced images in face order different from the face order at the reading time.

Other objects and features of the present invention will become apparent from the following detailed description and the attached drawings.

DETAILED DESCRIPTION OF THE PREFERRED EMBODIMENT

Figure 1:
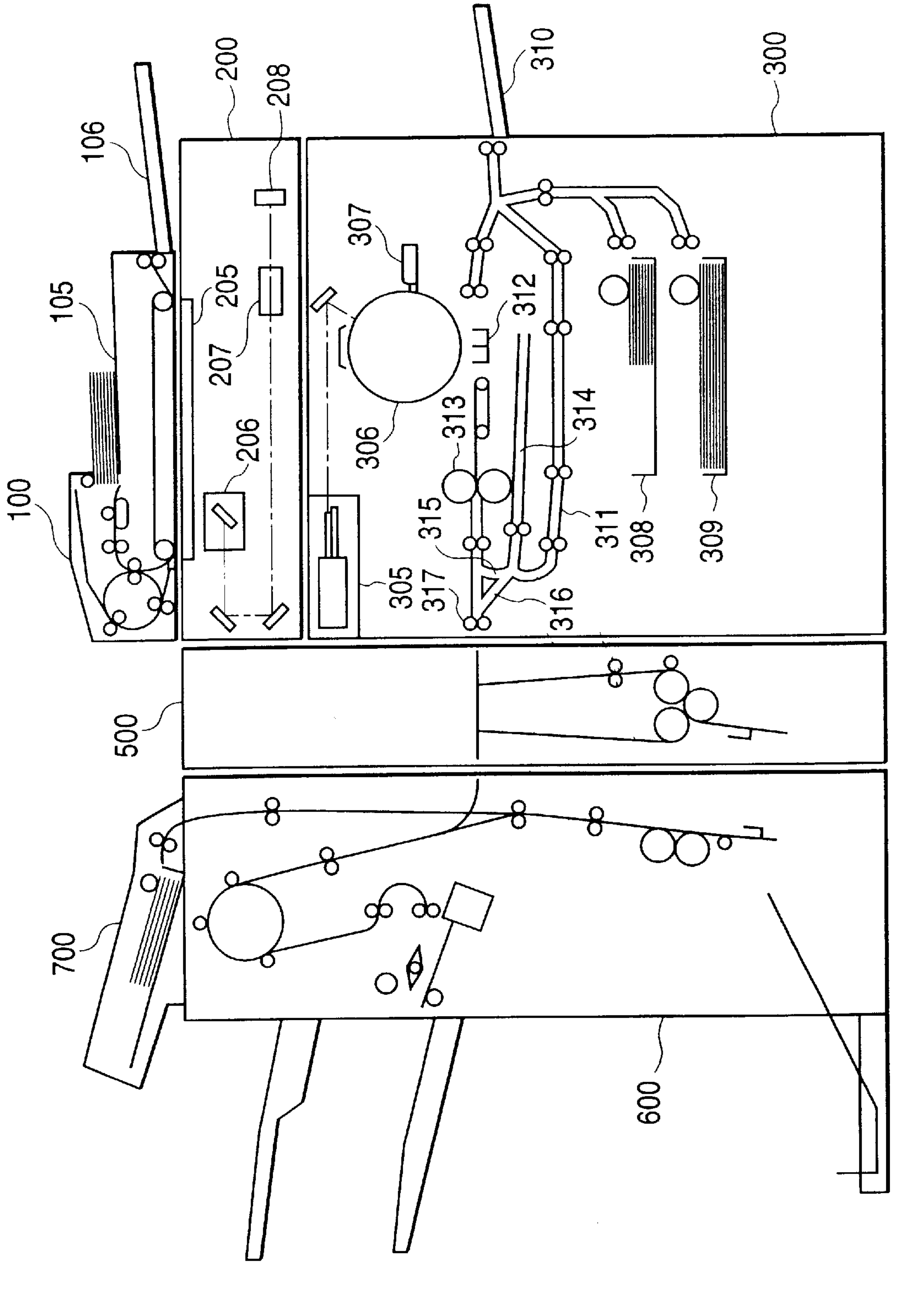
FIG. 1 is a sectional view showing the structure of an image formation apparatus.

Image formation apparatus and method according to an embodiment of the present invention will be explained hereinafter. FIG. 1 is a sectional view showing the structure of the image formation apparatus. The image formation apparatus is composed of the body, a folder 500 and a finisher 600. The body of the image formation apparatus is further composed of an image reader 200 and a printer unit 300. An original feeder (i.e., original or document feeding and carrying device) 100 is installed on the image reader 200.

The original feeder 100 feeds the original set on an original tray 105 from its first page one by one, carries the fed original onto a platen glass 205 through a curved path, and then stops the carried original. Then a scanner unit 206 is moved from left to right to read the original, and the original subjected to the image reading is discharged onto a sheet discharge tray 106.

Figure 2:
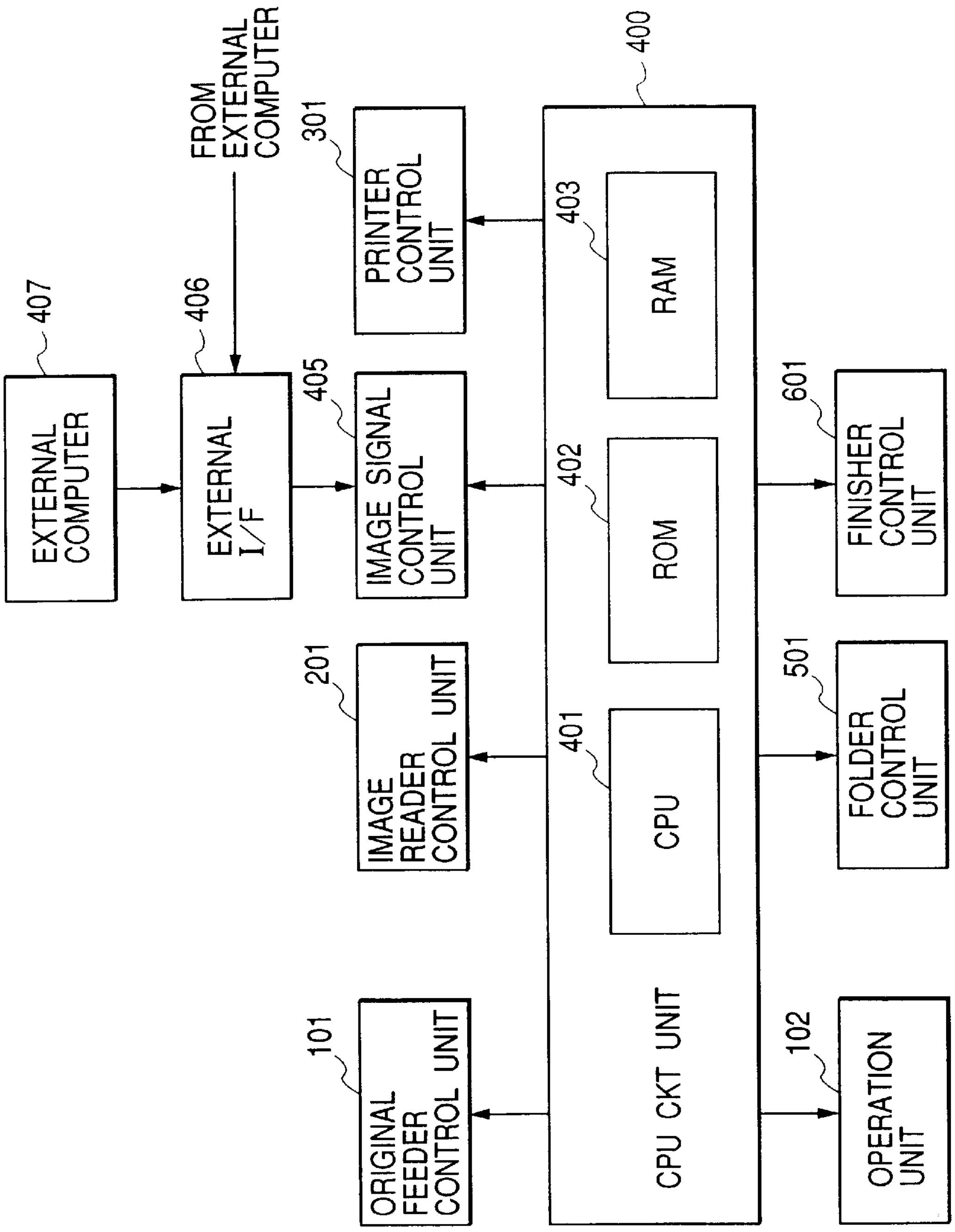
FIG. 2 is a block diagram showing the structure of the control unit of the image formation apparatus.

An image of the original which is read by an image sensor 208 through a lens 207 is subjected to image processing. The processed image is stored into an HD (hard disk) 413 (FIG. 3) and also transferred to an exposure control unit 305 through a printer control unit 301 (FIG. 2). The exposure control unit 305 outputs a laser beam according to an image signal. If the laser beam is irradiated to a photosensitive drum 306, an electrostatic latent image is formed on the drum 306. The electrostatic latent image on the photosensitive drum 306 is developed by a development unit 307, and a development agent on the drum 306 is transferred onto a sheet fed from either of a cassette 308, a cassette 309, a manual sheet feeder 310 or a double-faced carrying path 311 by a transfer unit 312.

The sheet onto which the development agent has been transferred is then guided to a fixing unit 313, and the development agent is subjected to fixing processing. The sheet which passed the fixing unit 313 is once guided from a path 315 to a path 314 by a not-shown flapper. After the trailing edge of the sheet passed the path 315, the sheet is switched back to guide it from a path 316 to a pair of discharge rollers (referred as discharge roller hereinafter) 317. Thus, it is possible to discharge the sheet from the printer unit 300 in the state that the face to which the development agent has been transferred is kept facedown. This operation is called "reverse sheet discharge".

As described above, in such a case as an image output from an external computer by using the original feeder 100 is printed, it is possible by discharging the sheet facedown to perform the image formation in due order (i.e., from first page to final page).

If the image is formed on a hard sheet such as an OHP (overhead projector) sheet fed from the manual sheet feeder 310, the sheet is not guided to the path 315 but discharged through the discharge roller 317 in the state that the face to which the development agent has been transferred is kept faceup.

If the images are formed onto both the faces (i.e., front and back faces) of the sheet, the sheet is guided from the fixing unit 313 to the paths 315 and 314. Then, immediately after the trailing edge passed the path 315, the sheet is switched back, and the sheet is guided to the double-faced carrying path 311 through a not-shown flapper. Again, an electrostatic image is transferred by the transfer unit 312 to the sheet guided to the path 311, and the transferred image is subjected to fixing processing by the fixing unit 313.

In the circular path which consists of the transfer unit 312, the path 315 and the double-faced carrying path 311, as described above, path lengths, roller arrangement and driving systems are independent from others such that the circular path can carry the sheets even if these sheets are five half-sized sheets (e.g., A4,B5, or the like). The order of double-faced copying is as shown in later-described FIG. 4C, and the order of discharging of the double-faced copy sheets is as shown in FIG. 4D. It should be noted that the order of the processing is the same as that in the conventional example 1. In this case, since the sheets are discharged with their odd pages facedown, it is possible to adjust the page order even in case of the double-faced copying.

The sheets which were discharged from the discharge roller 317 are then fed to the folder 500 which performs folding processing to Z-fold the fed sheets. If the folding processing is designated for an A3- or B4-sized sheet, the designated-sized sheet is subjected to the folding processing and then fed to the finisher 600 by the folder 500. However, the sheet other than the designated-sized sheet is fed to the finisher as it is. The finisher 600 performs bookbinding processing, binding processing, punching process and the like. An inserter 700 is disposed on the finisher 600 to feed a cover sheet, an insertion sheet or the like to the finisher 600.

FIG. 2 is a block diagram showing the structure of the control unit of the image formation apparatus. The control unit which entirely controls the image formation apparatus mainly includes a CPU circuit unit 400. The CPU circuit unit 400 includes a CPU 401, a ROM 402, a RAM 403 and the like.

In accordance with a program which has been stored in the ROM 402 and is executed by the CPU 401 and setting contents of an operation unit 102, the CPU circuit unit 400 controls an original feeder control unit 101 for controlling the original feeder 100, an image reader control unit 201 for controlling the image reader 200, an image signal control unit 405, the printer control unit 301 for controlling the printer unit 300, a folder control unit 501 for controlling the folder 500, a finisher control unit 601 for controlling the finisher 600, and an external I/F (interface) 406.

The RAM 403 is used as the area which temporarily stores control data and as the working area for calculation of the control. The external I/F 406 which interfaces with an external computer 407 expands or decompresses print data from the computer 407 to obtain a corresponding image and then outputs the expanded data to the image signal control unit 405.

The image reader control unit 201 outputs the image read by the image sensor 208 to the image signal control unit 405. The image data output from the image signal control unit 405 to the printer control unit 301 is then input to the exposure control unit 305.

Figure 3:
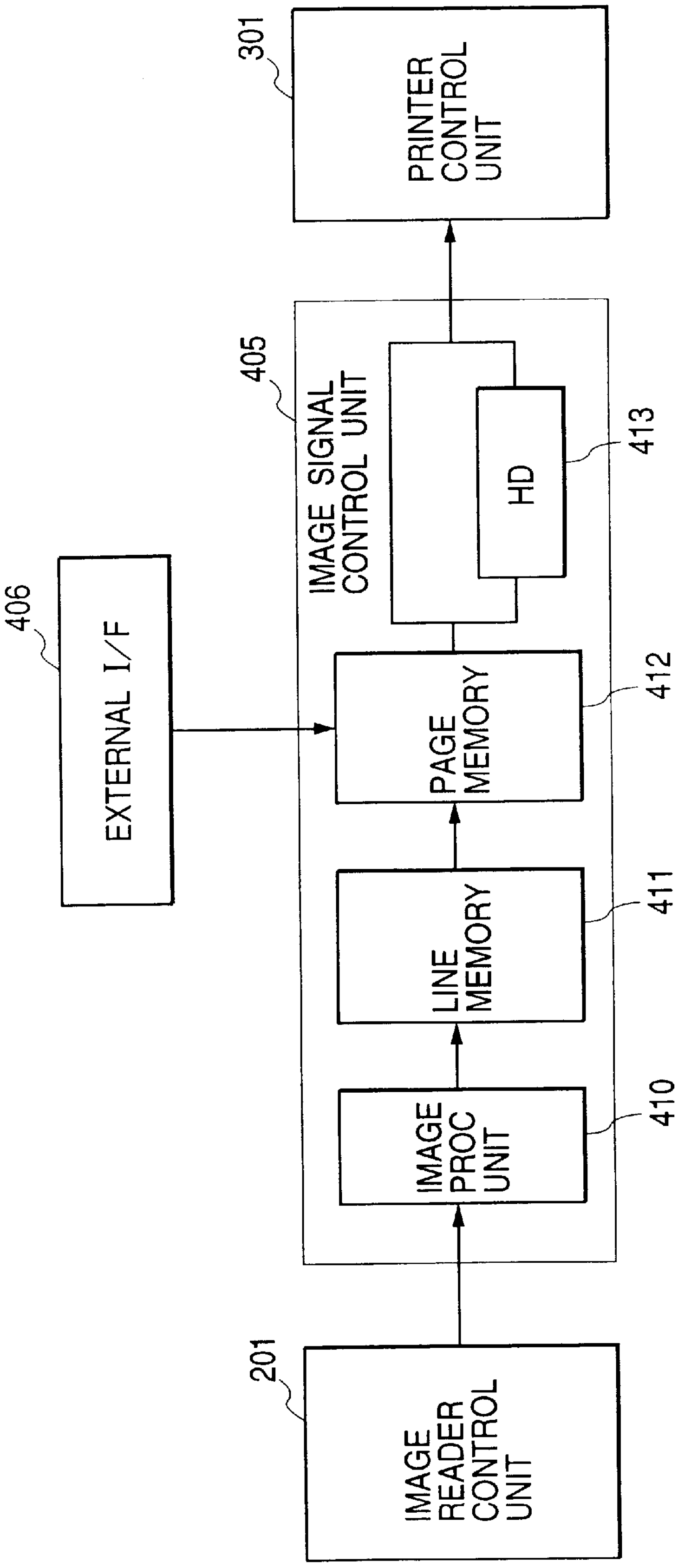
FIG. 3 is a block diagram showing the structure of an image signal control unit 405.

FIG. 3 is a block diagram showing the structure of the image signal control unit 405. The image signal control unit 405 includes an image processing unit 410, a line memory 411, a page memory 412 and the HD 413. The image processing unit 410 performs image correction processing and image editing processing according to the setting by the operation unit 102. The line memory 411 performs mirror image processing to interchange the images with each other in the main scan direction. The image in the line memory 411 is output to the printer control unit 301 through the page memory 412. When the order of pages to be printed is interchanged as described later, the HD 413 is used if necessary to store the images of the page memory 412.

(Procedure for Reading Double-Faced Original)

FIGS. 4A, 4B, 4C and 4D are views respectively showing order of original feeding, order of original image reading, order of image formation and order of copy discharging in a case where double-faced copying is performed from double-faced originals. In the embodiment, the case where two sets of double-faced copies (i.e., duplicates) are obtained from the three double-faced originals.

Figure 4A:
FIGS. 4A, 4B, 4C and 4D are views respectively showing order of original feeding, order of original image reading, order of image formation and order of copy discharging in a case where double-faced copying is performed from double-faced originals.

FIG. 4A shows the order of feeding of originals D1, D2 and D3 set to the original tray 105 of the original feeder 100. FIGS. 5A and 5B, FIGS. 6A and 6B, FIGS. 7A and 7B and FIGS. 8A and 8B respectively show feeding (or carrying) of the originals to be performed within the original feeder in the double-faced processing mode.

Figure 5A:
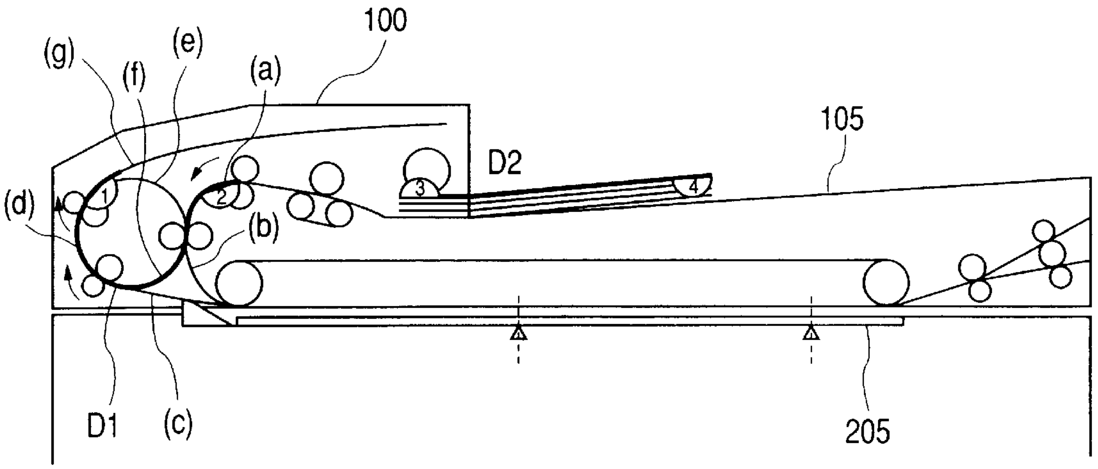
FIGS. 5A and 5B are sectional views showing original feeding to be performed within an original feeder in a double-faced processing mode.
Figure 5B:
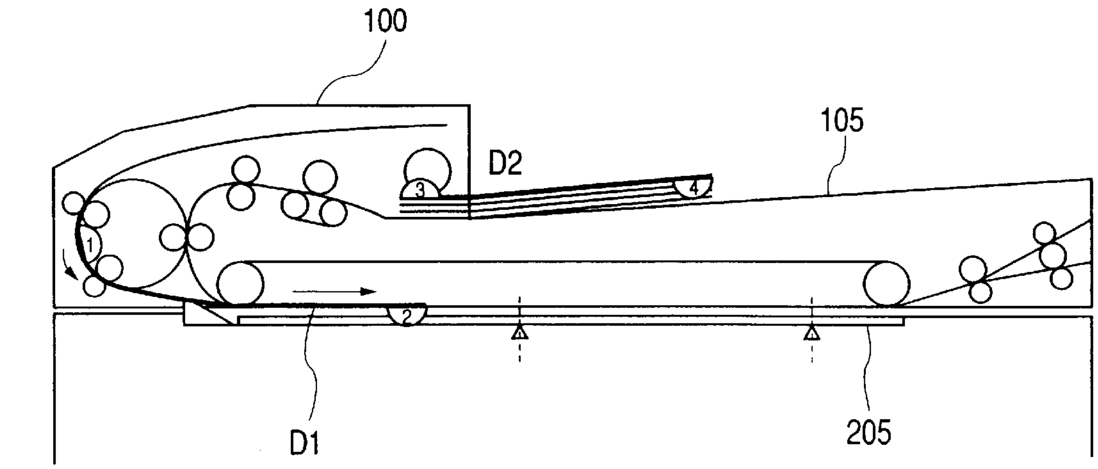
Figure 6A:
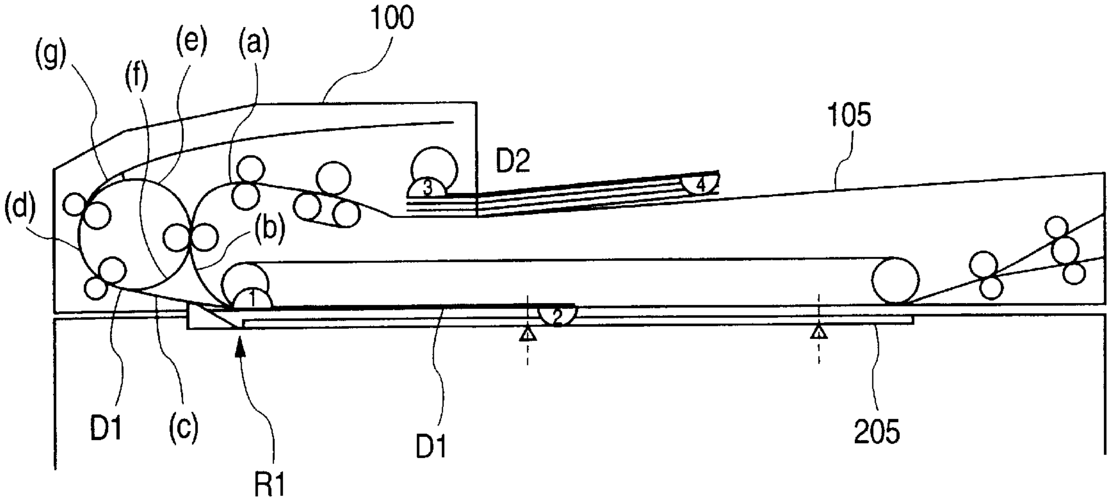
FIGS. 6A and 6B are sectional views showing original feeding to be performed within the original feeder in the double-faced processing mode.

First, the original D1 being the uppermost one of the originals is fed through paths (a), (f), (d) and (g) in that order (FIG. 5A). In the embodiment, it should be noted that the front face of the original D1 is represented by "1" and the back face thereof is represented by "2". After the trailing edge of the original D1 passed the path (f), the original D1 is switched back, whereby the original D1 is carried onto the platen glass 205 through a path (c) in the state that its second page (back face of the original D1) is kept facedown (FIG. 5B). After then, the original D1 is stopped at a read position R1 (FIG. 6A).

Figure 6B:
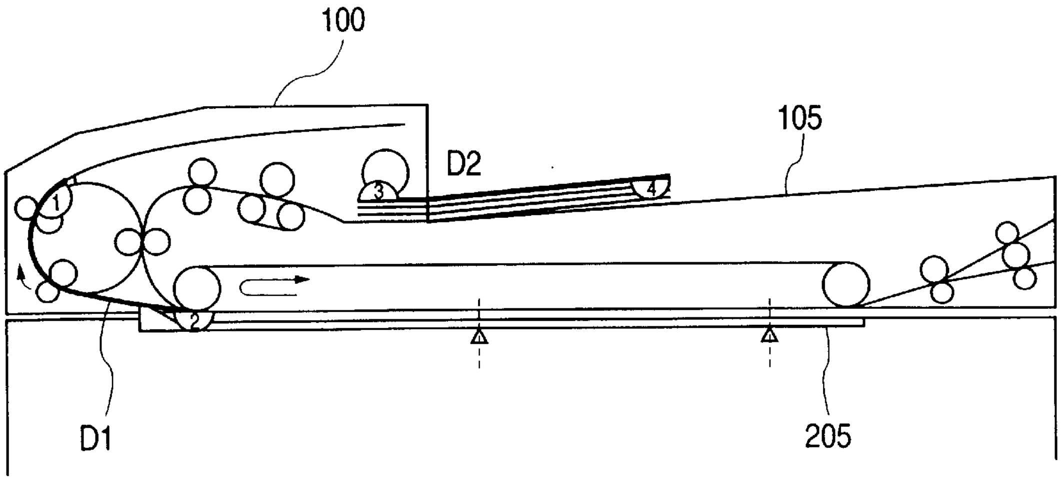

In the state that the original D1 stands at the read position R1, the scanner unit 206 is moved to read the original D1. After the image reading ended, the original D1 is again fed through the paths (c), (d), (e) and (b) in that order (FIG. 6B). Thus, the original D1 is reversed and fed onto the platen glass 205 in the state that its first page (front face of the original D1) is kept facedown. Then the original D1 stands thereon, and next image reading is performed.

Figure 7A:
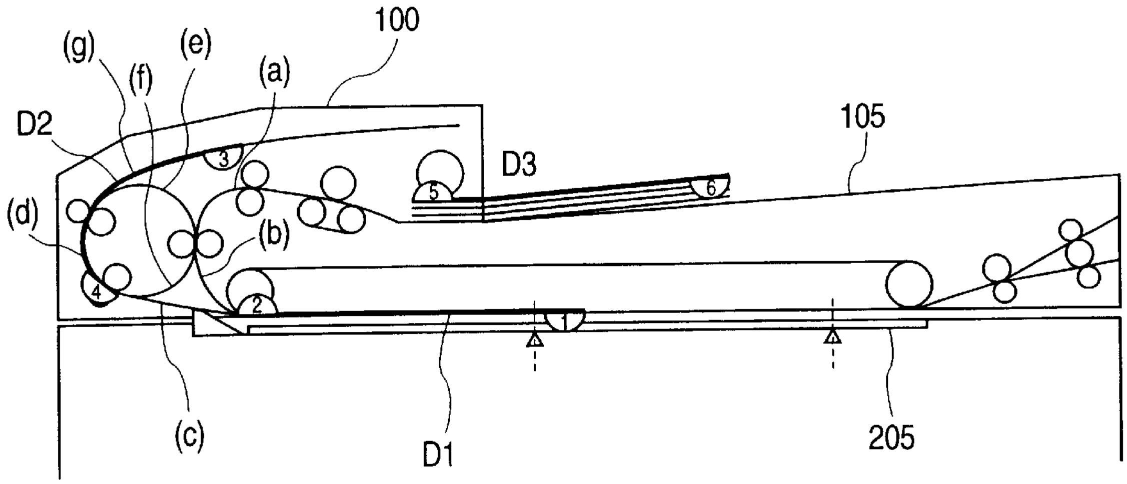
FIGS. 7A and 7B sectional views showing original feeding to be performed within the original feeder in the double-faced processing mode.

While the above-described image reading is performed, the next original D2 is fed through the paths (a), (f), (d) and (g) in that order to the position where the trailing edge of the original D2 passed the path (f), and the original D2 is on standby (FIG. 7A). This position is called "prereverse standby position".

Figure 7B:
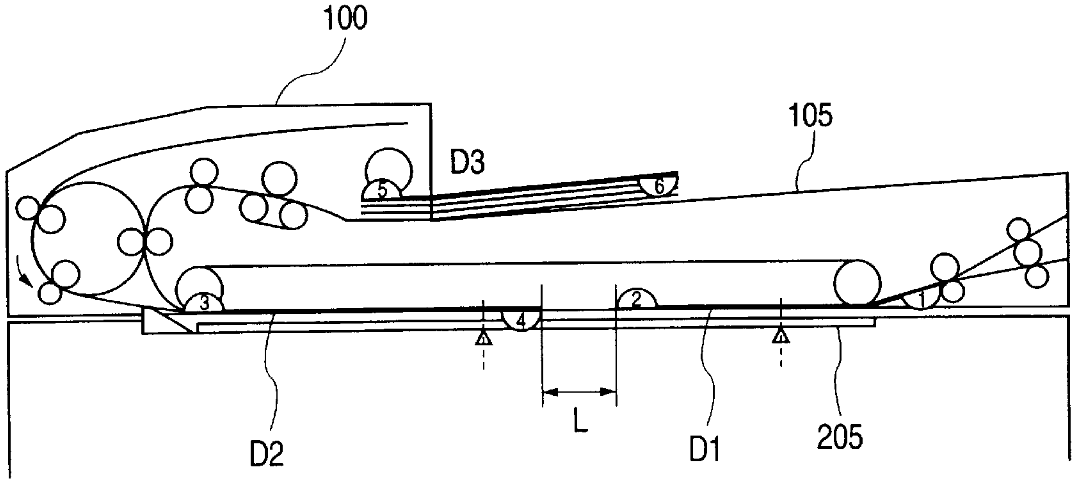

If the reading of the front face (first page) of the original D1 ends, the original D1 is fed to the sheet discharge tray 106 side. At the same time, the original D2 which is on standby in the paths (d) and (g) is fed onto the platen glass 205 with the fourth page facedown in the same manner as for the original D1 (FIG. 7B).

If the image reading of the fourth-page image ends, like the case of the original D1, the reverse processing of the original D2 starts. In this case, the original D2 is fed, and at the same time the previous original D1 is also fed toward the path (c). However, since an original interval L has been set to have an appropriate value, the original D1 still remains on the platen glass 205.

Figure 8A:
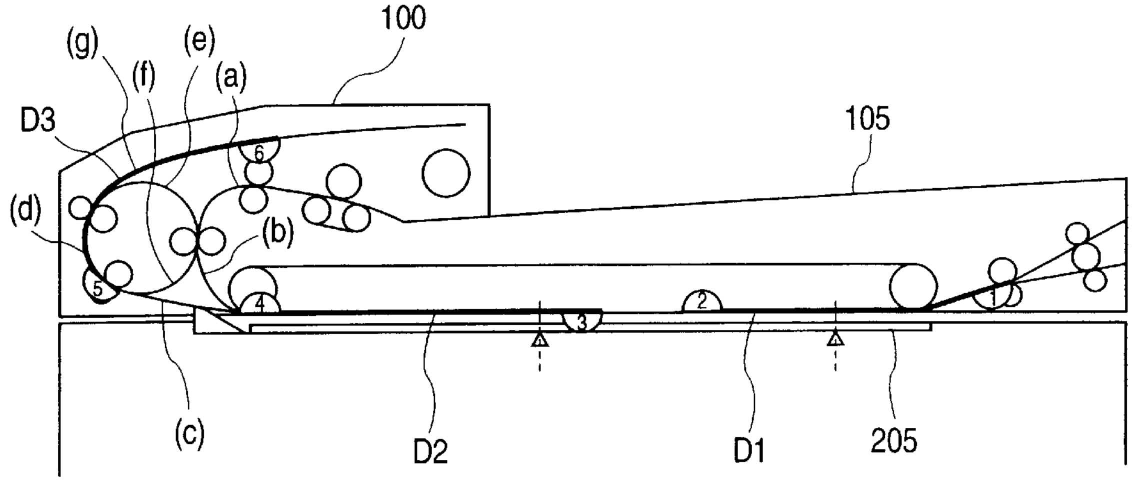
FIGS. 8A and 8B are sectional views showing original feeding to be performed within the original feeder in the double faced processing mode.
Figure 8B:
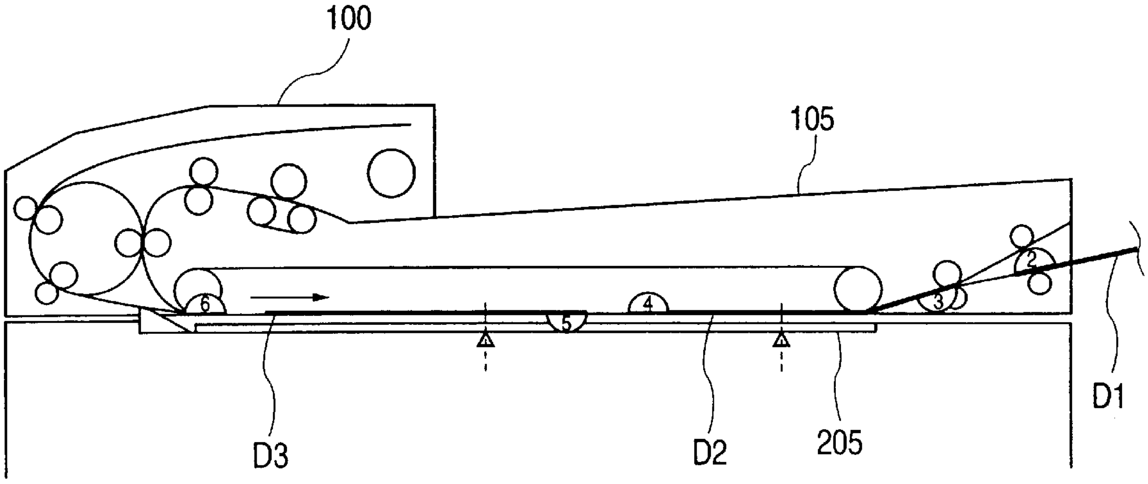
Figures 9A, 9B, 9C, 9D:
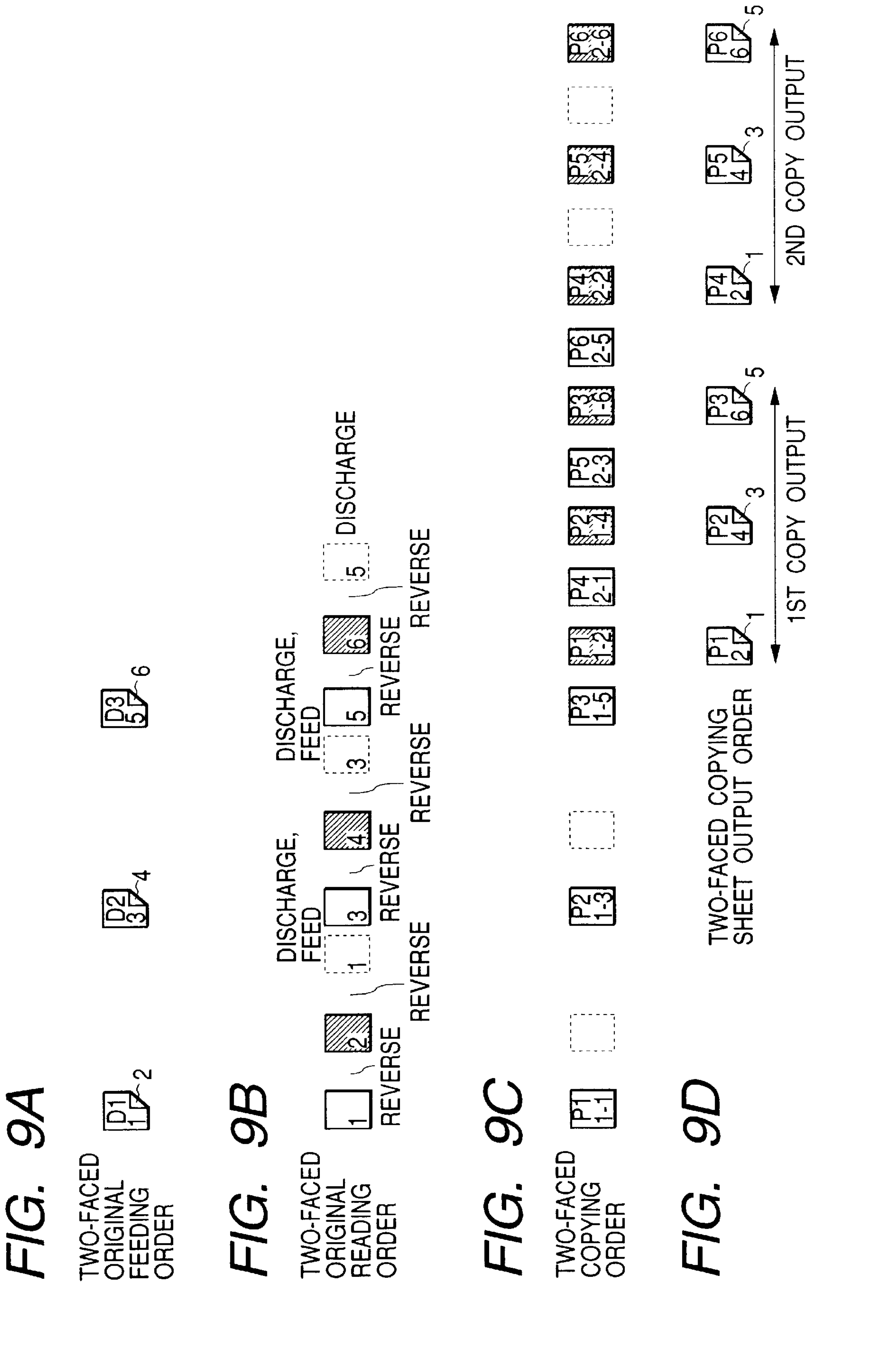
FIGS. 9A 9B, 9C and 9D are views respectively showing order of original feeding, order of original image reading, order of image formation and order of copy discharging in a conventional case where double-faced copying is performed from double-faced originals.
Figures 10A, 10B, 10C, 10D:
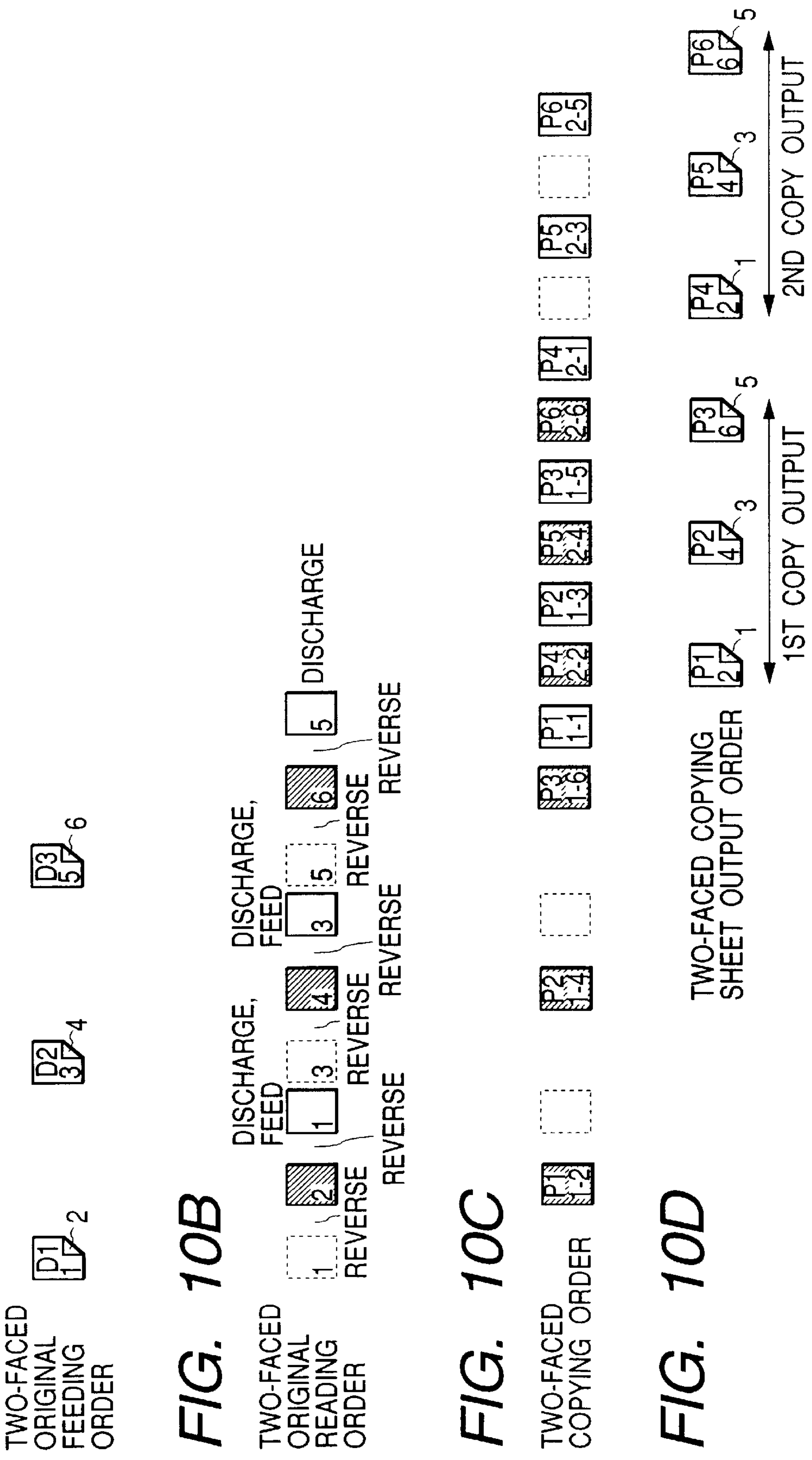
FIGS. 10A, 10B, 10C and 10D are views respectively showing order of original feeding, order of original image reading, order of image formation and order of copy discharging in another conventional case where double-faced copying is performed from double-faced originals.

If the reverse processing of the original D2 ends and the image reading of the third page starts, the next original D3 is on standby at the prereverse standby position (FIG. 8A). Then, if the image reading of the third page ends, the original D2 is fed to the sheet discharge tray 106 side, and the original D3 is simultaneously fed (FIG. 8B). At this time, the previous original D1 is discharged onto the sheet discharge tray 106.

Figure 4B:
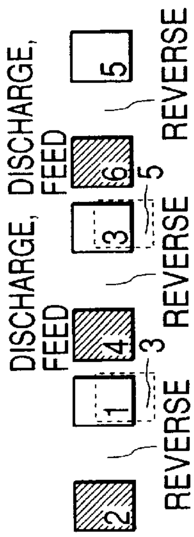

By repeating the above-described processing, as shown in later-described FIG. 4B, the images of the second, first, fourth, third, sixth and fifth pages read by the image sensor 208 in that order are subjected to the editing processing by the image processing unit 410, and then stored in the HD 413 through the line memory 411 and the page memory 412.

(Procedure for Forming Double-Faced Images)

Figure 4C:
Figure 4D:
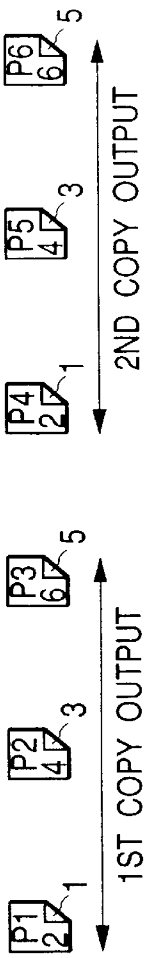

FIG. 4C shows the procedure of the printer control unit 301 to form the double-faced images. If the image data of the first page (i.e., the image data of the front face of the original D1) is stored into the HD 413, the printer control unit 301 is driven to start feeding of a sheet P1 from the cassette 308. Further, a laser-on signal (not shown) is output from the printer control unit 301 to the exposure control unit 305 to form the latent image based on the image data of the first page onto the photosensitive drum 306. Thus, the first copy image of the first original sheet (i.e., the image of the front face of the original D1) is formed onto the first page of the sheet P1. In this case, it should be noted that the image of the first original sheet and the first page is called "1-1 image", the image of the first original sheet and the third page is called "1-3 image", and the image of the first original sheet and the fifth page is called "1-5 image", hereinafter.

Subsequently, if the image data of the third page is stored into the HD 413, the laser-on signal is again output from the printer control unit 301 to form the latent image based on the image data of the third page, and the 1-3 image is formed onto the first face of a fed sheet P2. Further, if the image data of the fifth page is stored into the HD 413, the 1-5 image is formed onto the first face of a fed sheet P3.

Intervals of feeding of the sheet P from the cassette 308 and outputting of the laser-on signal are controlled such that the 1-1 image, the 1-3 image and the 1-5 image are formed at appropriate sheet intervals. Further, if the intervals among the sheets P1, P2 and P3 are relatively widened, the respective sheets can be on standby at appropriate positions.

If the 1-5 image is formed onto the sheet P3, the sheet P1 reversed by the reverse path 314 is fed to the transfer unit 312 through the double-faced carrying path 311. At this time, feeding of the following sheet P4 from the cassette 308 is stopped. Since the double-faced image data of the originals D1, D2 and D3 have been stored in the HD 413, the laser output signal for the image data of the second page is output in synchronism with arrival of the sheet P1 at the transfer unit 312.

The sheets are fed to the transfer unit 312 alternately from the cassette 308 and the double-faced carrying path 311. Hereafter, the corresponding images are formed onto the second face of the sheet P1, the first face of the sheet P4, the second face of the sheet P2, the first face of the sheet P5, the second face of the sheet P3, the first face of the sheet P6, the second face of the sheet P4, the second face of the sheet P5, and the second face of the sheet P6 in that order.

It is controlled that the sheet of which front and back faces have been subjected to the image formation processing is directly fed or carried from the transfer unit 313 to the discharge roller 317 side, and the sheet is discharged by the discharge roller 317 with its first face (i.e., odd page) facedown. Thus, the sheets sequentially discharged are stacked in the page order.

As described above, in the image formation apparatus, the double-faced original is read in the order of its back face and front face, and the read images of the original are formed onto the front and back faces of the sheet in that order. Thus, it is possible to stack the sheets in the page order without reversing the sheets when they are discharged.

Further, while the back face of the previous double-faced original is read, the next double-faced original is on standby at the prereverse standby position, whereby it is possible to perform high-speed image formation, thereby improving productivity in the double-faced processing mode.

In the image formation apparatus according to the above-described embodiment, the original feeder is provided. When the image of the original fed from the original feeder is read and formed onto the sheet, in the apparatus, the double-faced images of the original fed from the original feeder are read in the predetermined face order, the read double-faced images are stored in the storage means, and the stored double-faced images are then formed respectively onto the double faces of the sheet by the image formation means in the face order different from the face order at the reading time. Thus, it is possible to arbitrarily select the images of the front and back faces of the sheet discharged after the image formation is performed.

Therefore, it is possible dispense with the reverse operation of the originals after image reading which is to adjust the order of the pages of the originals to be discharged. Further, it is possible to discharge the sheets without reversing them to adjust the order of the pages of the sheets after the image formation to both the faces thereof ended. Thus, it is possible to realize a high-speed operation of the image formation apparatus, thereby improving productivity in case of forming the images onto both the faces of the sheet.

Further, the image read means reads the original fed from the original feeder in the order of its back face and front face, and the image formation means forms the read images of the double-faced original onto the front and back faces of the sheet in that order. Thus, after the sheet of which both the faces have been formed with the images is stacked facedown, it is possible to discharge the stacked sheets outside the apparatus in the page order without reversing the sheet.

Further, after the image read means reads the image on the back face of the original fed from the original feeder to the read position, the image read means reads the image on the front face of the original reversed and again fed to the read position by the original feeder. The original feeder discharges the original with the face from which the image was read facedown. After the image formation means forms the image of the read front face onto one face of the sheet fed to the image formation position by the sheet feeder, the image formation means forms the image of the read back face onto the other face of the sheet reversed and again fed to the image formation position by the sheet feeder. The sheet feeder discharges the sheet with the face on which the image of the back face of the original has been formed faceup. Thus, when the image is read from the lower face of the fed original and then the original is discharged, it is unnecessary to reverse the original to adjust the page order of the discharged originals. Also, when the image is formed onto the upper face of the sheet and then the sheet is discharged, it is unnecessary to reverse the sheet to adjust the page order of the discharged sheets.

Further, when the image of the back face of the original is read, the original feeder feeds the original put on the original tray to the reverse position to reverse it and then feeds the reversed original to the read position. Thus, it is possible to put the double-faced original on the original tray with its front face faceup. Further, it is possible to reverse the double-faced original before the original is fed from the original tray to the read position, thereby shortening the time necessary for the reverse operation.

Further, the original feeder feeds the next original to the reverse position and makes it on standby until the image on the front face of the previous original is read at the read position, whereby it is possible to further shorten the time necessary for the reading operation. As above, since the next original is fed before the previous original is discharged, it is possible to realize the high-speed reading operation on the original feeder side.

The present invention can be applied to a system consisting of plural devices (e.g., a host computer, an interface equipment, a reader, a printer and the like), or to an apparatus comprising a single device (e.g., a copy machine, a facsimile apparatus or the like).

Furthermore, it is needless to say that the object of the present invention can be achieved in a case where a storage medium storing therein program codes of software to realize the functions of the above-described embodiment is supplied to a system or an apparatus, and thus a computer (or CPU or MPU) in the system or the apparatus reads and executes the program codes stored in the medium.

In this case, the program codes themselves read out of the storage medium realize the function of the above-described embodiment. Therefore, the storage medium storing these program codes constitutes the present invention.

As the storage medium from which the program codes are supplied, e.g., a floppy disk, a hard disk, an optical disk, a magnetooptical disk, a CD-ROM, a CD-R, a magnetic tape, a non-volatile memory card, a ROM, or the like can be used.

Further, it is needless to say that the present invention includes not only a case where the functions of the above-described embodiment are realized by executing the program codes read by the computer, but also a case where an OS (operating system) or the like running on the computer performs a part or all of the actual processes on the basis of instructions of the program codes and thus the functions of the above-described embodiment are realized by such the processes.

Furthermore, it is needless to say that the present invention also includes a case where, after the program codes read out of the storage medium are written into a function expansion board inserted in the computer or a memory in a function expansion unit connected to the computer, a CPU or the like provided in the function expansion board or the function expansion unit performs a part or all of the actual processes on the basis of the instructions of the program codes, and thus the functions of the above-described embodiment are realized by such the processes.

The present invention is not limited to the above-described embodiment, and can be variously modified without departing from the scope of the claims.

What is claimed is:

1. An image formation apparatus which includes an original feeder, reads an image of an original fed from said original feeder, and forms the read image onto a sheet, comprising:

read means for reading an image of a double-faced original fed from said original feeder, in a first order in which a second face of the double-faced original is read first and a first face of the double faced original is read second;

storage means for storing the image read by the read means; and image formation means for forming the image of the double-faced original in a second order in which an image of the first face of the double-faced original is formed first and an image of the second face of the double-faced original is formed second.

2. An apparatus according to claim 1, wherein said read means reads the image on the second face of the double-faced original fed to a read position from said original feeder and then reads the image on the first face of the double-faced original reversed and again fed to the read position by said original feeder, said original feeder discharges the double-faced original in a state which the first face of the double-faced original face downward, said image formation means forms the image of the first face of the double-faced original onto one face of the sheet fed to an image formation position by a sheet feeder, and then forms the image of the second face of the double-faced original onto another face of the sheet reversed and again fed to the image formation position by said sheet feeder, and said sheet feeder discharges the sheet in a state which a face having the image of the second face of the double-faced original faces upward.

3. An apparatus according to claim 2, wherein, in case of reading the image on the second face of the double-faced original, said original feeder feeds the double-faced original set on an original tray to a reverse position to reverse the double-faced original, and then feeds the reversed double-faced original to the read position.

4. An apparatus according to claim 3, wherein said original feeder feeds the next double-faced original to the reverse position and makes the next double-faced original on standby until the image on the first face of the double-faced original is read at the read position.

5. An image formation apparatus which includes an original feeder, reads an image of an original fed from said original feeder, and forms the read image onto a sheet, comprising:

a reader for reading an image of a double-faced original fed from said original feeder, in a first order in which a second face of the double-faced original is read first and a first face of the double-faced original is read second;

a memory for storing the image read by said read means; and an image forming unit for forming the image of the double-faced original in a second order in which an image of the first face of the double-faced original is formed first and an image of the second face of the double-faced original is formed second.

6. An apparatus according to claim 5, wherein said reader reads the image on the second face of the double-faced original fed to a read position from said original feeder and then reads the image on the first face of the double-faced original reversed and again fed to the read position by said original feeder, said original feeder discharges the double-faced original in a state in which the first face of the double-faced original faces downward, said image forming unit forms the image of the first face of the double-faced original onto one face of the sheet fed to an image formation position by a sheet feeder, and then forms the image of the second face of the double-faced original onto another face of the sheet reversed and again fed to the image formation position by said sheet feeder, and said sheet feeder discharges the sheet in a state in which a face having the image of the second face of the double-faced original faces upward.

7. An apparatus according to claim 6, wherein, in a case of reading the image on the second face of the double-faced original, said original feeder feeds the double-faced original set on an original tray to a reverse position to reverse the double-faced original, and then feeds the reversed double-faced original to the read position.

8. An apparatus according to claim 7, wherein said original feeder feeds the next double-faced original to the reverse position and places the next double-faced original on standby until the image on the first face of the double-faced original is read at the read position.

9. An apparatus according to claim 5, wherein said read step reads an image of a second page, a fourth page, and a third page of the double-faced originals sequentially, and wherein said image formation step forms the image of the first page, the second page, the third page, and the fourth page sequentially.

10. An image formation method which reads an image of an original fed from an original feeder, and forms the read image onto a sheet, comprising:

a read step of reading an image of a double-faced original fed from the original feeder, in a first order in which a second face of the double-faced original is read first and a first face of the double-sided original is read second;

a storage step of storing the read image; and an image formation step of forming the image of the double-faced original in a second order in which an image of the first face of the double-faced original is formed first and an image of the second face of the double-faced original is formed second.

11. A method according to claim 10, wherein said read step reads the image on the second face of the double-faced original fed to a read position from said original feeder and then reads the image on the first face of the double-faced original reversed and again fed to the read position by the original feeder, said original feeder discharges the double-faced original in a state in which the first face of the double-faced original faces downward, said image formation step forms the image of the first face of the double-faced original onto one face of the sheet fed to an image formation position by a sheet feeder, and then forms the image of the second face of the double-faced original onto another face of the sheet reversed and again fed to the image formation position by said sheet feeder.

12. A method according to claim 11, wherein, in case of reading the image on the second face of the double-faced original, said original feeder feeds the double-faced original set on an original tray to a reverse position to reverse the double-faced original, and the feeds the reversed double-faced original to the read position.

13. A method according to claim 12, wherein said original feeder feeds the next double-faced original to the reverse position and places the next double-faced original on standby until the image on the first face of the double-faced original is read at the read position.

14. A method according to claim 10, wherein said read step reads an image of a second page, a first page, a fourth page, and a third page of the double-faced originals sequentially, and wherein said image formation step forms the image of the first page, the second page, the third page, and the fourth page sequentially.

* * * * *

UNITED STATES PATENT AND TRADEMARK OFFICE

CERTIFICATE OF CORRECTION

PATENT NO. : 6,304,743 B1 
DATED : October 16, 2001
INVENTOR(S) : Takayuki Fujii et al.

It is certified that error appears in the above-identified patent and that said Letters Patent is hereby corrected as shown below:

Column 1,
Line 8, "to" should read -- to an --;
Line 9, "read" should read -- reads --;
Line 55, "Simlarly, the image of the fifth page" should be deleted; and
Lines 56 and 58, "lines 56 through 58" should be deleted.

Column 4,
Line 10, "7B" should read -- 7B are --.

Column 8,
Line 36, "possible" should read -- possible to --.

Column 12,
Line 15, "downward," should read -- downward, and --; and
Line 27, "the" (first occurrence) should read -- then --.

Signed and Sealed this

Twenty-third Day of April, 2002

*Attest:*

JAMES E. ROGAN

*Attesting Officer* *Director of the United States Patent and Trademark Office*